United States Patent [19]

Lim

[11] 4,343,912

[45] Aug. 10, 1982

[54] NOVEL METHOD FOR REDUCING THE PROCESSING TEMPERATURE OF THERMOPLASTIC POLYMERS AND NOVEL BLOWING AGENT CONCENTRATES PRODUCED THEREBY

[75] Inventor: In C. Lim, Pittsburgh, Pa.

[73] Assignee: Mobay Chemical Corporation, Pittsburgh, Pa.

[21] Appl. No.: 304,398

[22] Filed: Sep. 21, 1981

Related U.S. Application Data

[60] Division of Ser. No. 49,834, Jun. 18, 1979, Pat. No. 4,313,873, which is a continuation-in-part of Ser. No. 921,529, Jul. 3, 1978, abandoned.

[51] Int. Cl.$^3$ ............................ C08J 9/06; C08L 91/00
[52] U.S. Cl. ........................................ 521/90; 521/93; 521/97; 521/134; 521/180; 525/69; 525/70; 525/146; 525/413; 524/275; 524/537
[58] Field of Search ............... 260/31.8 R, 18 TN; 521/90, 97, 93, 134, 180; 525/69, 70, 146, 413

[56] References Cited

U.S. PATENT DOCUMENTS

| | | | |
|---|---|---|---|
| 3,398,212 | 8/1968 | Jackson, Jr. et al. | 528/125 |
| 3,725,321 | 4/1973 | Wirth et al. | 260/2.5 R |
| 3,763,059 | 10/1973 | Needham | 521/143 |
| 3,779,954 | 12/1973 | Wirth et al. | 260/2.5 R |
| 3,781,233 | 12/1973 | Muller et al. | 260/2.5 R |
| 3,803,060 | 4/1974 | Roos et al. | 260/2.5 R |
| 3,846,523 | 11/1974 | Geerdes | 521/143 |
| 3,873,477 | 3/1975 | Beck et al. | 260/2.5 |
| 3,888,802 | 6/1975 | Hunter | 260/2.5 R |
| 3,925,270 | 12/1975 | Hunter | 260/2.5 R |
| 4,097,421 | 6/1978 | Chang | 521/182 |
| 4,263,409 | 4/1981 | Liberti | 521/81 |

FOREIGN PATENT DOCUMENTS

| | | |
|---|---|---|
| 2608925 | 5/1977 | Fed. Rep. of Germany . |
| 2725100 | 2/1979 | Fed. Rep. of Germany . |
| 1293120 | 10/1972 | United Kingdom . |
| 1423175 | 1/1976 | United Kingdom . |

OTHER PUBLICATIONS

"Polyester" Goodman et al., vol. 1, 1965, London Iliffe Books Ltd., pp. 2,3,142,143.
"The Merck Index", 9th Ed. Merck & Co. Inc., pp. 1310,215,216.

*Primary Examiner*—Morton Foelak
*Attorney, Agent, or Firm*—Gene Harsh; Lawrence S. Pope; Aron Preis

[57] ABSTRACT

The present invention pertains to a method for reducing the processing temperature of a thermoplastic polymer comprising blending the thermoplastic polymer in powder form with an effective amount of a compound having a softening temperature of about 20° to 200° C. lower than the softening temperature of the thermoplastic polymer. The invention further pertains to novel chemical blowing agent concentrates.

5 Claims, No Drawings

NOVEL METHOD FOR REDUCING THE PROCESSING TEMPERATURE OF THERMOPLASTIC POLYMERS AND NOVEL BLOWING AGENT CONCENTRATES PRODUCED THEREBY

This application is a division, of application Ser. No. 49,834, filed June 18, 1979, now U.S. Pat. No. 4,313,873, which itself is a continuation-in-part of U.S. application Ser. No. 921,529 filed 7-3-78, now abandoned.

FIELD OF THE INVENTION

This invention relates to a method of processing high softening temperature, thermoplastic polymers and more particular to a method of processing such thermoplastic polymers at lower temperatures than those currently used. The invention further relates to novel chemical blowing agent concentrates.

BACKGROUND OF THE INVENTION

Commercial processing of thermoplastic polymers, such as extrusion and molding, is well-known in the prior art and may be accomplished by a diverse variety of techniques. Generally, thermoplastic polymers have softening temperatures of about 130° C. and higher and, therefore, require processing at temperatures significantly higher, such as 200° C. and higher.

In the past, these 200° C. and higher processing temperatures were of little concern because the necessary heat could be generated from a variety of heat sources and capital equipment. However, with the current worldwide energy shortage and the increasing concern related to the worker's environment, there is a need for a commercial process which permits high-softening temperature thermoplastic polymers to be processed at temperatures lower than those currently used. Such a lower processing temperature represents a significant reduction in energy used, a significant savings in energy costs and an improvement in the worker's environment since less heat is likely to be dissipated by the processing equipment.

Furthermore, it is desirable to prepare thermoplastic polymers which contain additives, such as chemical blowing agents, thermostabilizers, hydrolytic stabilizers, mold release agents, pigments, etc. which are molded or extruded at a later date or at a different site. When incorporating additives in such thermoplastic polymers, it is desirable to use as low a temperature as possible in order to minimize the heat histories of such additives and thermoplastic polymers in order to avoid deterioration of the physical, mechanical or chemical properties of the thermoplastic polymer or additives.

A severe problem currently exists in the preparation of a masterbatch or concentrate of a thermoplastic polymer intimately blended with a chemical blowing agent. It is often easier first to prepare such masterbatches or concentrates and then subsequently add them to a larger quantity of a compatible thermoplastic polymer. However, due to the processing temperature necessary to soften many thermoplastic polymers, a chemical blowing agent cannot be intimately blended with the polymer to form a concentrate without activating the chemical blowing agent. This problem, therefore, often requires the physical blending of such a chemical blowing agent with a thermoplastic polymer at the actual molding site making this molding step more expensive, cumbersome and difficult due to the powder form of many chemical blowing agents.

Thus, a real need exists for a process which permits high softening temperature, thermoplastic polymers to be processed at temperatures lower than those currently used.

In accordance with the present invention, a method is provided which permits high softening temperature, thermoplastic polymers to be processed at temperatures lower than those currently used. Novel chemical blowing agent concentrates are further provided.

SUMMARY OF THE INVENTION

The present invention pertains to a method for reducing the processing temperature of a thermoplastic polymer comprising blending the thermoplastic polymer in powder form with an effective amount of a compound having a softening temperature of about 20° to 200° C. lower than the softening temperature of the thermoplastic polymer. In a preferred embodiment of the invention, the thermoplastic polymer is polycarbonate, and the compound having a lower softening temperature is a chemical blowing agent. Another aspect of the invention pertains to chemical blowing agent concentrates prepared by the novel process of the invention.

DETAILED DESCRIPTION OF THE INVENTION

It has surprisingly been found that the processing temperature of a thermoplastic polymer may be reduced by blending the thermoplastic polymer in powder form with a compound having a softening temperature of about 20° to 200° C. lower than that of the thermoplastic polymer.

Suitable thermoplastic polymers in the present invention include any of those known in the prior art, preferably those thermoplastic polymers having softening temperatures of about 130° C. and higher and most preferably those thermoplastic polymers having softening temperatures of about 200° C. and higher. Suitable thermoplastic polymers include polycarbonates, high molecular weight polyethylene, acrylonitrile-butadiene-styrene copolymers, polyurethanes, polyphenylene oxides, polystyrene, polyamides, polyesters, polysulfones and polyacrylonitriles. The preferred thermoplastic polymers include polycarbonates and acrylonitrile-butadiene-styrene copolymers. The most preferred thermoplastic polymer is polycarbonate.

In order to reduce the processing temperatures of the thermoplastic polymers, it is essential that the polymers be used in powder form. Powder form is understood for the purposes of this invention to describe discrete particles of dry material having a maximum particle size diameter of less than about 1,000 microns, preferably less than about 800 microns.

The above-noted thermoplastic polymers are made by well-known methods and are then powdered by standard grinding and powdering techniques if necessary.

Suitable polycarbonates may be produced by known synthesis routes, such as those disclosed in German Pat. Nos. 926,274 and 1,046,311 and U.S. Pat. Nos. 2,964,794; 2,970,131; 2,991,273; 2,999,846; 3,028,365; 3,153,008; 3,187,065; 3,215,668; and 3,248,414, all incorporated herein by reference.

Suitable acrylonitrile-butadiene-styrene copolymers may be produced by known synthesis routes, such as those disclosed in U.S. Pat. Nos. 3,130,177; 3,509,237; and 3,509,238, all incorporated herein by reference.

In combination with a powdered thermoplastic polymer, it is essential that a compound be used which has a softening temperature of about 20° to 200° C. lower, preferably about 50° to 100° C. lower, than the softening temperature of the thermoplastic polymer. Such lower softening temperature compounds are further characterized in that they are chemically inert with respect to the thermoplastic polymer, are compatible with the thermoplastic polymer and do not increase the viscosity of the thermoplastic polymer during processing.

The lower softening temperature compound is present in the blend in an effective amount to reduce the processing temperature of the thermoplastic polymer. Preferably, the lower softening temperature compound is present in from about 0.1 to 50% by weight, most preferably about 0.5 to 30% by weight, and most particularly about 0.5 to 5% by weight, based on the weight of the thermoplastic polymer and the lower softening temperature compound.

Suitable preferred lower softening temperature compounds include low molecular weight polyethylene, polycaprolactone, phthalic anhydride, zinc stearate, cadmium stearate, zinc laurate and chemical blowing agents such as isatoic acid anhydride, sold under the trade name of KemTec 500 HP by Sherwin Williams Chemical Co., and 5-phenyl tetrazole, sold under the trade name of Expandex OX-5PT by Stepan Chemical Company.

The lower softening temperature compounds may be blended with the thermoplastic polymers in known mixing and processing devices such as single-screw and twin-screw extruders. These lower softening temperature compounds may be blended in any physical form, but are preferably blended in powder form.

In a preferred embodiment of the present invention, is has been found that a chemical blowing agent concentrate comprising a polycarbonate base resin and a compatible chemical blowing agent may now, for the first time, be prepared at a temperature of at most about 180° C. if the process of the present invention is used. In the past, it has been necessary to process (extrude) polycarbonate at temperatures of from about 230° to 250° C. in order to intimately blend it with other additives. However, such high processing temperatures are well above the activation temperature of many chemical blowing agents. Thus, homogeneous chemical blowing agent-/polycarbonate concentrates have been difficult to make. By the process of the present invention, the processing temperature of polycarbonate can be reduced to about 150° to 180° C. permitting intimate blending of a chemical blowing agent without activation of the blowing agent.

The most preferred chemical blowing agent concentrate produced by the process of the present invention comprises from about 70 to 99.9% by weight of polycarbonate, about 0.1 to 30% by weight of a chemical blowing agent and about 0 to 5% by weight, preferably 0.5 to 2% by weight, of low molecular weight polyethylene, based on the weight of the chemical blowing agent concentrate.

The invention will be further illustrated, but is not intended to be limited, by the following examples.

EXAMPLES

EXAMPLE 1

840 grams of bisphenol A-based polycarbonate having a particle size of less than about 500 microns and a melt flow rate of about 12 to 24 g/10 min. (ASTM D-1238) were tumble blended with about 10 grams of powdered oxidized low molecular weight polyethylene having a molecular weight of about 8,000 and a melting point of about 140° C. and 150 grams of powdered isatoic acid anhydride as a chemical blowing agent. The resulting blend was then fed into a hopper and then fed into a 2" Top Flight single screw extruder having a barrel temperature of about 180° C. The extrudate produced in this example was homogeneous and uniform in appearance, indicating intimate and effective blending, and contained the chemical blowing agent in an unactivated form. The pelletized extrudate was found to be a good chemical blowing agent concentrate.

EXAMPLE 2

Example 1 was repeated except that the polycarbonate was in pellet form which was about 3200 microns long by about 2286 to 3048 (avg. 2540) microns in diameter. The resulting extrudate was non-uniform and non-homogeneous indicating incomplete and ineffective blending of the polycarbonate with the low molecular weight polyethylene and the isatoic acid anhydride chemical blowing agent at a processing temperature of about 180° C.

EXAMPLE 3

750 grams of the powdered polycarbonate used in Example 1 were tumble blended with 100 grams of polycaprolactone having a melting point of about 60° C. in pellet form and 150 grams of powdered isatoic acid anhydride and extruded in a single screw extruder as in Example 1, but at a barrel temperature of about 160° C. The resulting extrudate was homogeneous and uniform in appearance indicating intimate and effective blending.

EXAMPLE 4

800 grams of the powdered polycarbonate used in Example 1 were tumble blended with 100 grams of polycaprolactone in pellet form having a melting point of about 60° C. and 100 grams of 5-phenyl tetrazole in powder form as a chemical blowing agent and extruded in a single screw extruder as in Example 1, but at a barrel temperature of about 160° C. The resulting extrudate was homogeneous and uniform in appearance indicating intimate and effective blending.

EXAMPLE 5

840 grams of the powdered polycarbonate used in Example 1 were blended with 10 grams of powdered, oxidized, low molecular weight polyethylene having a molecular weight of about 8,000 and a melting point of about 140° C. and 150 grams of powdered isatoic acid anhydride as a chemical blowing agent. The resulting blend was then fed into a Warner & Pfleiderer Model ZSK 53 mm. twin-screw extruder having a barrel temperature of about 170° C. The extrudate produced was homogeneous and uniform in appearance indicating intimate and effective blending.

EXAMPLE 6

800 grams of the powdered polycarbonate used in Example 1 were blended with 100 grams of polycaprolactone in pellet form having a melting point of about 60° C. and 100 grams of 5-phenyl tetrazole as a chemical blowing agent and extruded in a twin-screw extruder as in Example 5 except at a barrel temperature of about 165° C. the resulting extrudate was homogeneous and uniform in appearance indicating intimate and effective blending.

EXAMPLE 7

870 grams of a powdered 24 wt. % acrylonitrile-18 wt. % butadiene-58 wt. % α-methylstyrene copolymer having a molecular weight of about 66,000 and a heat deflection temperature according to ASTM D-648 of 104.4° C. at a 264 PSI load and 109.5° C. at a 66 PSI load were tumble blended with 25 grams of polycaprolactone in pellet form having a melting point of about 60° C., 5 grams of powdered, oxidized low molecular weight polyethylene having a molecular weight of about 8,000 and a melting point of about 140° C. and 100 grams of 5-phenyl tetrazole as a chemical blowing agent in powder form and extruded in a single screw extruder as in claim 1, but at a barrel temperature of about 150° C. The resulting extrudate was homogeneous and uniform in appearance indicating intimate and effective blending. The acrylonitrile-butadiene-α-methylstyrene copolymer powder had the following particle size profile:

| MESH SIZE | % POWDER REMAINING IN MESH |
|---|---|
| 8 (2380 microns) | 0 |
| 20 (840 microns) | 1.6 |
| 40 (420 microns) | 12.4 |
| 100 (140 microns) | 48.4 |
| 200 (74 microns) | 30.0 |

EXAMPLE 8

970 grams of the acrylonitrile-butadiene-α-methylstyrene copolymer used in Example 7, but in pellet form having a cubical shape with side dimensions of 2540 (±381) microns were tumble blended with 25 grams of polycaprolactone in pellet form having a melting point of about 60° C. and 5 grams of powdered, oxidized low molecular weight polyethylene having a molecular weight of about 8,000 and a melting point of about 140° C. and extruded in a single screw extruder as in claim 1, but at a barrel temperature of about 150° C. The resulting extrudate was non-uniform and non-homogeneous in appearance indicating incomplete and ineffective blending.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a chemical blowing agent concentrate comprising a polycarbonate, a compound having a softening temperature of about 20° to 200° C. lower than the softening temperature of the polycarbonate and a chemical blowing agent at a temperature of at most about 180° C. comprising extruding a polycarbonate in powder form having a maximum particle size diameter of less than about 1000 microns with a chemical blowing agent and said compound.

2. A chemical blowing agent concentrate produced at a temperature of at most about 180° C. comprising an intimate extruded blend of a polycarbonate in powder form having a maximum particle size diameter of less than about 1000 microns, a compound having a softening temperature of about 20° to 200° C. lower than the softening temperature of the polycarbonate and a chemical blowing agent the activation temperature of which is not higher than the processing temperature of said polycarbonate.

3. The chemical blowing agent concentrate of claim 2 wherein the chemical blowing agent is present in about 0.1 to 30% by weight, based on the weight of the chemical blowing agent concentrate.

4. The chemical blowing agent concentrate of claim 3 wherein said compound is a low molecular weight polyethylene and is present in from about 0.5 to 2.0% by weight, based on the weight of the blowing agent concentrate.

5. A chemical blowing agent concentrate comprising an intimate blend of a polycarbonate powder having a maximum particle size diameter of less than about 1000 microns, a compound having a softening temperature of 20° to 200° C. lower than the softening temperature of the polycarbonate and a chemical blowing agent which has an activation temperature of less than about 250° C.

* * * * *